United States Patent [19]

Hotz et al.

[11] Patent Number: 5,117,360
[45] Date of Patent: May 26, 1992

[54] JOINT SURVEILLANCE TARGET ATTACK RADAR SYSTEM (JSTARS)

[75] Inventors: Charles R. Hotz, Satellite Beach; Gerald J. McNiff, Indian Harbor Beach; Dale Burton, Melbourne, all of Fla.

[73] Assignee: Grumman Aerospace Corporation, Bethpage, N.Y.

[21] Appl. No.: 500,182

[22] Filed: Mar. 28, 1990

[51] Int. Cl.$^5$ .................................. G06F 15/14
[52] U.S. Cl. .................... 364/423; 342/195; 364/922.5; 364/923.4
[58] Field of Search ............ 342/195; 364/922.8, 364/922.5, 923.4, 423, 270.7

[56] References Cited

U.S. PATENT DOCUMENTS

| H,513 | 8/1988 | Dunne et al. | 364/900 X |
|---|---|---|---|
| 4,244,018 | 1/1981 | Mui | 364/200 X |
| 4,740,909 | 4/1988 | Conklin et al. | 342/195 X |
| 4,816,993 | 3/1989 | Takahashi et al. | 364/200 |
| 4,825,213 | 4/1989 | Smrek | 342/195 |
| 4,858,110 | 8/1989 | Miyata | 364/200 |
| 4,943,978 | 7/1990 | Rice | 364/200 |

Primary Examiner—Tod R. Swann
Attorney, Agent, or Firm—Richard G. Geib; Daniel J. Tick

[57] ABSTRACT

The central data processor of a radar system includes a plurality of Raytheon Company militarized VAX computer family model 860 super-minicomputers, each having a Raytheon Company MVCF-860 input/output expansion chassis and a Control Data corporation militarized disk system unit. A high speed, asynchronous, bidirectional communications channel provides a communications interface between a programmable signal processor and the super-minicomputers. A joint tactical information distibution system asynchronous, bidirectional communications channel interfaces a joint tactical information distribution system to the super-minicomputers. A plurality of militarized advanced disk system units and small computer systems interfaces of a digital display processor are interposed between one of the militarized advanced disk system units and the digital display processor. An operator work station local area network interfaces the digital display processor and the input/output expansion chassis of the central data processor.

5 Claims, 5 Drawing Sheets

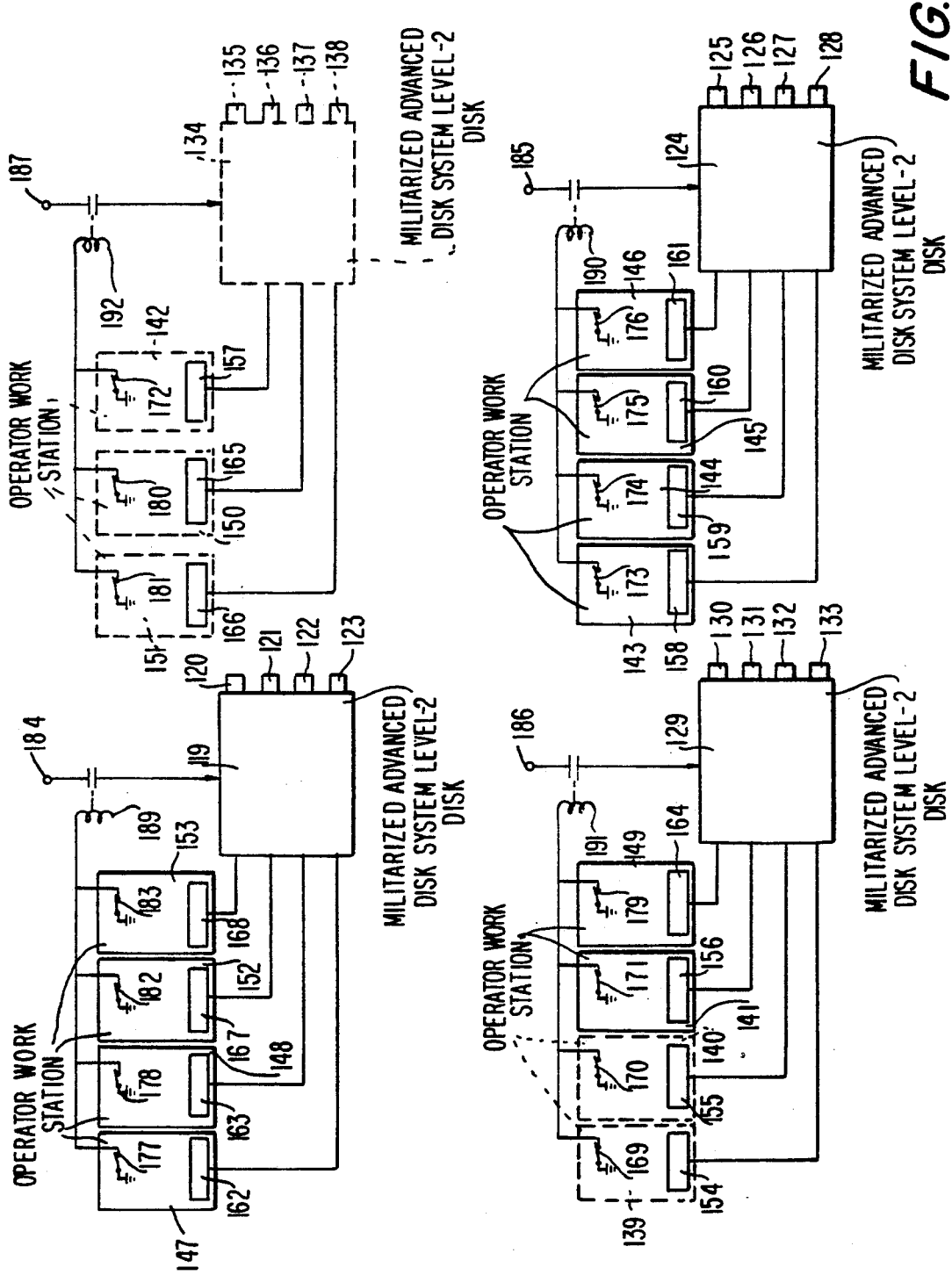

JOINT SURVEILLANCE TARGET ATTACK RADAR SYSTEM (JSTARS)

BACKGROUND OF THE INVENTION

The present invention relates to a joint surveillance target attack radar system, hereinafter referred to as JSTARS. More particularly, the invention relates to an airborne segment of JSTARS and the computer processors thereof.

JSTARS is designed to detect, track and classify formations of vehicles as they move through the "corps area" towards the front line. The "corps area" is the area in which such forces are most vulnerable to attack by aircraft or missiles such as the Army Tactical Missile System (ATACMS), and is usually considered to extend some 150-175 km behind the front line. In order to have a reasonable chance of survival, however, any airborne radar system has to remain well behind the friendly line. Thus, JSTARS must spot individual moving vehicles at very long ranges.

This is done with the assistance of a large antenna, with high average power and high peak power. The size of the antenna is approximately 24 ft long by 2 ft deep. It is mechanically scanned in elevation, can swivel to look on either side of the aircraft and is scanned electronically in azimuth. The system operates in X-band, providing the necessary resolution and range.

The sheer size of the antenna is in itself significant in the detection of low-speed targets. Doppler shifts in the ground clutter, due to the movement of the platform, are inevitable and can blur the Doppler shifts from slow-moving targets. The size of the antenna is important because, if the antenna is larger, the beam is narrower. The Doppler shifts in the ground return are spread over a smaller velocity range.

The basic moving target indication (MTI) mode used in JSTARS was developed in the late 1970s, and also takes advantage of the size of the antenna. In a simplified example of the process, two side-looking antennas could be mounted on the same aircraft, separated longitudinally. The second would pulse slightly later than the other, but at precisely the same point in space. Static targets would give identical returns to each pulse, but a moving target would be different. Subtracting the returns would reveal the "mover" through the main-lobe clutter.

This principle is used in JSTARS, but in a much refined manner. The process is carried out synthetically by the programmable signal processor, and the antenna acts as three sub-arrays rather than two. The signal subtraction is done twice, once between the front and center sub-arrays and once between the center and rear sub-arrays, so there are two target signals. The difference in phase of arrival between these signals provides a very accurate indication of the target's bearing in azimuth. The system's computers compare the result with the on-board terrain database and the target's range, and calculate the target's exact three-dimensional position.

JSTARS is not a synthetic aperture radar (SAR) as such. SAR relies on the movement of the platform to provide a very large-aperture, very high-resolution image of static objects on the ground. SAR and MTI are complementary: SAR cannot see targets that move and MTI cannot see them when they stop. JSTARS does have a SAR mode, which is used in precisely that event. If the operator sees a group of targets vanish from MTI, he can activate SAR and confirm that they have stopped. SAR can also be used for strike damage assessment. Targets that do not move after an attack may have been hit.

Although the operational implementation of Pave Mover technology was controversial from the start, unlike a system reliant on a large ground station, JSTARS can be operational anywhere in the world in a matter of hours, playing the same non-threatening, crisis-management role as the E-3.

There are 17 operation and control station consoles. This reflects the ability of the system to supply data and the number of uses to which JSTARS information can be put. Each operator console has a screen, trackball and reconfigurable, touch-sensitive keypads.

Similar terminals are installed in mobile ground stations. All moving-target information is broadcast through the surveillance and control data link and the operators can request other information, such as SAR imagery, which is compressed before transmission.

The 17 operators can each concentrate on a different target area. Each can command a wide range of functions: wide area search, covering the entire area in view; sector search, in which the radar searches a particular area or a selected road; attack planning or control, in which a target area is viewed at higher resolution; target classification; and SAR/fixed-target modes, in which the radar can be set to display only targets above a given size.

As the operators command the radar to do different tasks, they share time on the radar. Each task is assigned a priority and a "revisit interval", as the radar completes one task, the control software sorts through the tasks that are due to be revisited and instructs the radar to do the job that has the highest priority. With electronic scanning in azimuth and extremely rapid scanning in elevation, the radar is highly agile.

ACD—Aircraft Change Directive
ACP—Advanced Computer Program
ACSN—Advanced Change Study Notice
ADT—Air Data Terminal (of the SCDL)
APL—Acceptable Performance Level
ATP—Acceptance Test Plan (or Procedure)
ATR—Air Transport Rack
BIT—Built-in-Test
CCC—Change Configuration Control
CDC—Control Data Corporation
CDP—Central Data Processor
CDR—Critical Design Review
CDRL—Contracts Data Requirements List
CFE—Contractor Furnished Equipment
CG—Center of Gravity
CMOS—Cadmium Metal Oxide Semiconductor
COTS—Commercial Off-the-Shelf
CPCI—Computer Program Configuration Item
CPI—Computer Program Item
CPU—Central Processing Unit
CSE—Common Support Equipment
CWS—Communications Work Station
DARTS—Data Analysis and Reduction Test Software
DBCP—Data Bus Control Processing
DCAS—Defense Contracting Auditing Service
DCL—Digital Command Language
DCP—Digital Control Program
DDB—Digital Data Bus (a MIL-STD-1553B bus)
DDED—Design Data Element Dictionary
DDP—Digital Display Processor DEC—Digital Equipment Corporation
DECNET—DEC Network (A Trademark Product of Digital Equipment Corp.)
DED—Data Element Dictionary
DFS—Data Formatting System
DIB—Digital Interface Buffer
DITMCO—Continuity Tester ("Drive-In Theater Maintenance Co.")
DMA—Direct Memory Access
DRP—Data Reduction Program
DTM—DEC/Test Manager
ECS—Environmental Control System
EEPROM—Electrically Erasable Programmable Read Only Memory
EMC—Electromagnetic Compatibility
EMI—Electromagnetic Interference
EO—Engineering Order
ESMC—Embedded Single Board Module Computer
ESS—Environmental Stress Screening
EXP—Raytheon MVCF-860 Computer Expansion Chassis
FCA—Functional Configuration Audit
FFF—Form, Fit and Function
FMECA—Failure Mode Effects and Criticality Analysis
FQT—Formal Qualification Test
FRACAS—Failure Reporting and Corrective Actions System
FRP—Facilities Requirements Plan
FSD—Full Scale Development
GD—General Display
GFE—Government Furnished Equipment
GPC—General Purpose Computer
GPS—Geographic Positioning System
I&Q—In Phase and Quadrature Radar Data
ICD—Interface Control Document
ICS—Intercom Control System
IFPM—In-Flight Performance Monitor
IJSS—Integrated JSTARS Simulation
ILS—Integrated Logistics System
IMS—Inertial Measurement System
INU—Inertial Measurement Unit
IOU—Input/Output Unit (for the HAWK/32)
IPB—Illustrated Parts Breakdown
ISR—Interrupt Service Routine
ITF—Integration and Test Facility
ITQ—Invitation to Quote
J/B—Junction Box
JBIC—Junction Box Interface Card
JDB—JTIDS Data Bus (a MIL-STD-1553B bus)
JTIDS—Joint Tactical Information Distribution System
LAN—Local Area Network
LCC—Life Cycle Cost
LED—Light Emitting Diode
LRU—Line Replaceable Unit
LSA—Logistics Support Analysis
LSAR—Logistics Support Analysis Report
LSE—Language Sensitive Editor
MADS—Militarized Advanced Disk System
MAF—Mission Archive File
$\mu$AFP—Micro Advanced Flexible Processor
MILVAX—Militarized VAX computer, proprietary name for computer product
MSM—Memory Support Module
MSU—Mission Support Utilities
MTBF—Mean Time Between Failures
MTI—Moving Target Indication
MVCF-860—Militarized VAX Computer Family Model 860, manufactured by Raytheon
NCP—Network Control Program
NDDL—Network Display and Development Lab
NDI—Non-Developmental Item
NHIT—Network Heat Interface Test
NTDS—Naval Tactical Data System
OCO—Operations and Control Operations
OCTL—Operations and Control Test Lab
ORT—Operational Readiness Test
OWS—Operator Work Station
PCA—Physical Configuration Audit
PCM—Power Control Module
PCU—Pulse Compression Unit
PDIR—Price and Delivery Information Request
PDL—Processor Development Lab
PDR—Preliminary Design Review
PDU—Program Development Unit
PIDS—Prime Item Development Specification
PMB—Processor Memory Bus
PME—Prime Mission Equipment
PMR—Program Management Review
PN—Part Number
PQT—Preliminary Qualification Test
PS—Programmable Signal
PSE—Peculiar Support Equipment
PSP—Programmable Signal Processor
RADB—Requirements Allocation Database
RAM—Random Access Memory
RCU—Radar Control Unit
RDO—Radar Data Operations
RDP—Radar Data Processor
RDS—Radar Data Stimulator
RDU—Radar Data Unit
REBNA—Raytheon Ethernet Bus-interconnect Network Adapter
RL—Runtime Library
RMB/32—Synchronous/Asynchronous Communications Card
RMS—Record Management Services
RSB—Radar Subsystem Bus (a MIL-STD-1553B bus)
RTL—Radar Test Lab
RTMM—Removable Transportable Memory Modules
SAR—Synthetic Aperture Radar
SASS—Scenario and Simulation System
SCA—Source Code Analyzer
SCDL—Surveillance and Control Data Link
SCM—Software Configuration Management
SCP—Simulation Control Program
SCR—Seller Change Request
SCSI—Small Computer Systems Interface
SDF—Software Development Facility
SDS—Self Defense Suite
SDU—Software Development Unit
SEF—Scenario Execution Function
SERD—Support Equipment Recommendation Data
SGF—Scenario Generation Function
SID—System Integration and Development Facility
SIT—Software Integration Test
SLPV—System Level Performance Verification
SMD—Storage Module Device
SMP—Symmetric Multiprocessing
SOW—Statement of Work
SPC—Signal Processing Controller
SPM—System Performance Monitor
SPTE—System Page Table Entries
SQA—Software Quality Assurance
SRD—Seller Requirements Document SRU—Shop Replaceable Unit
SSU—System Support Utilities
STDI—Standard Interface
STL—System Test Lab
SYD—System Diagnostics
TBD—To Be Determined
TBS—To Be Supplied
TIDB—Test and Integration Data Base
TIM—Technical Interchange Meeting
TJ—Terminal Junction
TO—Technical Order
TOD—Time-of-Day
TPU—Test Processing Utility
TRD—Test Requirements Document
TSG—Threat Scenario Generator
UNIX—An operating System
VAX—DEC family of compatible computers
VLSI—Very Large Scale Integration
VMS—Virtual Management System (DEC operating system)
VPC—Vector Processor Controller
VPCA—VAX Performance and Coverage Analyzer
VRTX—Virtual Real-Time Executive (operating system)
VSS—VAX System Support
VUP—VAX Unit of Processing
XMAU—External Memory Access Unit The principal object of the invention is to provide a JSTARS which provides sufficient flexibility and growth to present future functional and technical enhancements to be incorporated with minimal impact.

An object of the invention is to provide a JSTARS which accommodates planned functional enhancements and provides the flexibility necessary to address the projected functional enhancements of the system.

Another object of the invention is to provide a JSTARS having the processing path capability necessary to permit future enhancements.

Still another object of the invention is to provide a JSTARS having improved overall system reliability and maintainability.

Yet another object of the invention is to provide a JSTARS having a decreased life cycle cost.

An object of the invention is to provide a JSTARS having great system flexibility.

Another object of the invention is to provide a JSTARS having minimized aircraft impacts.

Still another object of the invention is to provide a JSTARS having a decreased number of militarized computers, thereby decreasing the amount and complexity of software necessary to control and coordinate them.

Yet another object of the invention is to provide a JSTARS having minimized software development impact.

An object of the invention is to provide a JSTARS which permits baselining of the production configuration.

Another object of the invention is to provide a JSTARS having improved built-in test.

Still another object of the invention is to provide a JSTARS which requires no new PSE.

Yet another object of the invention is to provide a JSTARS which requires fewer spares.

An object of the invention is to provide a JSTARS having improved software maintenance capabilities.

Another object of the invention is to provide a JSTARS with decreased facility requirements for data module storage.

Still another object of the invention is to provide a JSTARS which is more compact than known systems.

Yet another object of the invention is to provide a JSTARS which is less complex than known systems.

An object of the invention is to provide a JSTARS which is more powerful than known systems.

Another object of the invention is to provide a JSTARS having enhanced overall maintainability through its advanced computer program via in-flight repair capability for the disk units, reduction in fault isolation time, elimination of a special card extraction tool, identical hardware for both Level-1 and Level-2 disk units and less maintenance due to higher mean time between failures of equipment and fewer line replaceable units in the system.

Still another object of the invention is to provide a JSTARS having an advanced computer program which provides the flexibility necessary to address the projected functional enhancements of the system.

The key to the architectural solution is the militarized computer.

BRIEF SUMMARY OF THE INVENTION

In accordance with the invention, in operation and control means of a radar system, central data processor means comprises a plurality of militarized computer family super-minicomputers, each having an input/output expansion chassis and a militarized advanced disk system unit.

Each of the militarized computer family super-minicomputers comprises a Raytheon Company militarized VAX computer family model 860 super-minicomputer.

Each of the input/output expansion chassis comprises a Raytheon Company MVCF-860 I/O expansion chassis.

Each militarized advanced disk system unit comprises a Control Data Corporation militarized advanced disk system unit.

The militarized computer family super-minicomputers number three, each of the militarized computer family super-minicomputers comprises a Raytheon Company militarized VAX computer family model 860 super-minicomputer, each of the input/output expansion chassis comprises a Raytheon Company MVCF-860 I/O expansion chassis and each militarized disk system unit comprises a Control Data Corporation militarized advanced disk system unit.

In accordance with the invention, in operator work station means of a radar system, digital display processor means comprises a plurality of militarized advanced disk system units and small computer systems interface means interposed between one of the militarized advanced disk system units and the digital display processor means.

The militarized advanced disk system units number three and each comprises a Control Data Corporation militarized advanced disk system unit.

In accordance with the invention, in a radar system, central data processor means comprises a plurality of militarized computer family super-minicomputers, each having an input/output expansion chassis and a militarized disk system unit. A programmable signal processor means is provided. A high speed, asynchronous, bidirectional communications channel provides a communications interface between the programmable signal processor means and the super-minicomputers. A joint tactical information distribution system means is provided. A joint tactical information distribution system asynchronous, bidirectional communications channel interfaces the joint tactical information distribution system means to the super-minicomputers. Digital display processor means comprises a plurality of militarized advanced disk system units and small computer systems interface means interposed between one of the militarized advanced disk system units and the digital display processor means.

Operator work station local area network means interfaces the digital display processor means and the input/output expansion chassis of the central data processor means.

Each of the militarized computer family super-minicomputers comprises a Raytheon Company militarized VAX computer family model 860 super-minicomputer.

Each of the input/output expansion chassis comprises a Raytheon Company MVCF-860 I/O expansion chassis.

Each militarized advanced disk system unit comprises a Control Data Corporation militarized advanced disk system unit.

The militarized computer family super-minicomputers number three.

BRIEF DESCRIPTION OF THE DRAWINGS

In order that the invention may be readily carried into effect, it will now be described with reference to the accompanying drawings, wherein:

FIG. 5 is a block diagram of the Level-2 configuration of three MADS units.

DETAILED DESCRIPTION OF PREFERRED EMBODIMENTS

Radar systems which are basic to the JSTARS of the invention are described in U.S. Pat. No. 4,546,354 of Sol Boles, which issued Oct. 8, 1985, U.S. Pat. No. 4,546,355 of Sol Boles, which issued Oct. 8, 1985, U.S. Pat. No. 4,549,184 of Sol Boles and Walter J. Smrek, which issued Oct. 22, 1985, U.S. Pat. No. 4,563,686 of Sol Boles, which issued Jan. 7, 1986, U.S. Pat. No. 4,723,124 of Sol Boles, which issued Feb. 2, 1988 and U.S. Pat. No. 4,825,213 of Walter J. Smrek, which issued Aug. 25, 1989, all assigned to the Assignee of the present invention. The JSTARS of the invention is based upon and disclosed in the aforedescribed patents.

Figure 1:
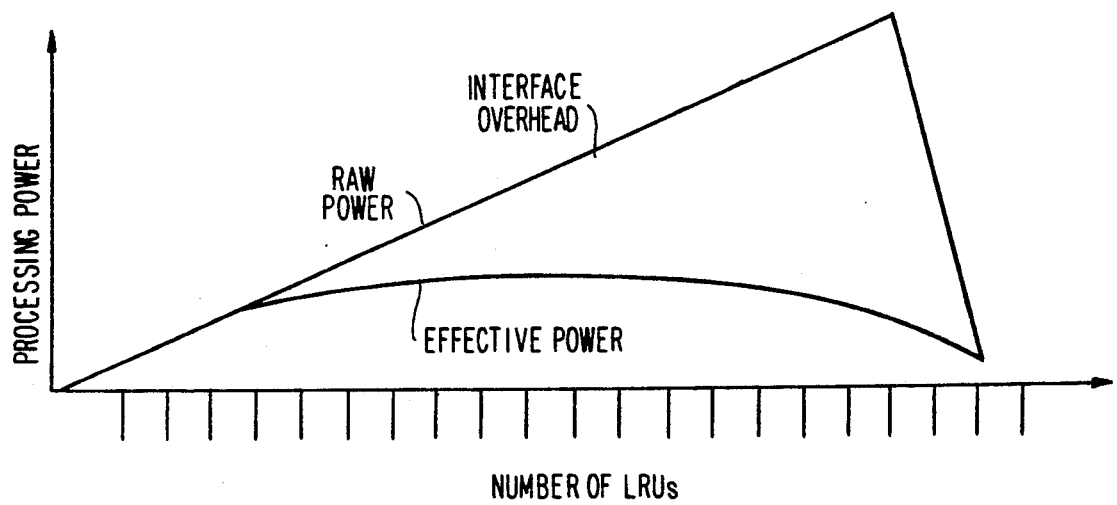
FIG. 1 is a graphical presentation of processing power versus overhead.

Complex software must be utilized to coordinate the functions contained within the processors of a distributed system. As the number of processors increases, the additional raw processing power gained is offset by the overhead penalties incurred with managing distributed processing, as shown in FIG. 1. In FIG. 1, the abscissa represents the number of LRUs and the ordinate represents the processing power.

Figure 2:
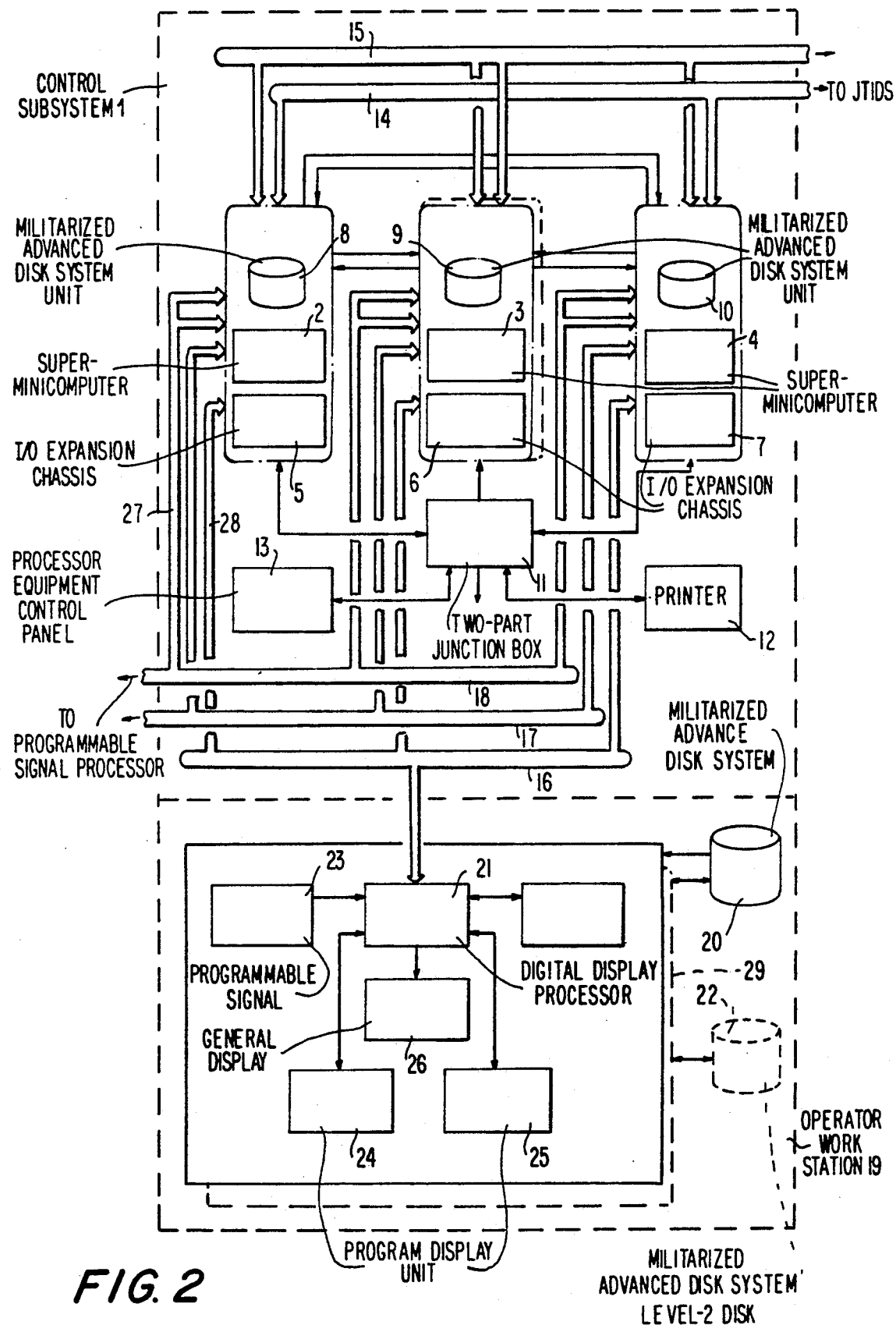
FIG. 2 is block diagram of an embodiment of the JSTARS of the invention.

In the embodiment of the JSTARS baseline architecture of the invention, shown in FIG. 2, in the operations and control subsystem 1, the data processors (DP) are three Raytheon militarized VAX computer family model 860 (MVCF-860) super-minicomputers 2, 3 and 4. The IOUs are three Raytheon MVCF-860 I/O expansion chassis 5, 6 and 7 in the disclosed embodiment of the invention. Furthermore, the Control Data Corporation (CDC) militarized advanced disk system (MADS) units 8, 9 and 10 are utilized in the preferred embodiment of the invention.

A two-port junction box 11 interconnects the computers 2, 3 and 4 with a printer 12 and a processor equipment control panel 13. The computers 2, 3 and 4 are connected to a JTIDS bus 14, a DDB bus 15, an operator work station local area network 16, a radar subsystem bus 17 and a programmable signal processor local area network 18.

In the operator work station 19, one CDC MADS spindle supports it with a full CDC MADS Supporting four operator workstations.. A small computer systems interface is used between the MADS Level-2 disk 22, and the operator workstation. A programmable signal 23 is fed to the DDP 21 and program display units 24 and 25 are connected to said DDP. The DDP 21 is connected to a general display 26.

Each of the three Raytheon militarized VAX computer family model 860 (MVCF-860) super-minicomputer systems consists of a main chassis, an expansion chassis, and a CDC militarized advanced disk system. This complex of three MVCF-860 systems replaces the entire group of seven Hawk/32 minicomputers, two Hawk/32 input/output units, and three 4020 Level-1 disk units, previously utilized in the operations and control subsystem 1 of the JSTARS. Tests prove that the performance of a single MVCF-860 super-minicomputer, configured with a single CPU, is greater than twice that of a single Hawk/32 minicomputer. The MVCF-860 super-minicomputer configuration contains three CPUs and performs five times greater than that of a single Hawk/32. Based upon this performance, the configuration of three MVCF-860 super-minicomputers, two of which are active, provides a net increase in total on-line computational capability greater than twice that of a seven Hawk/32 minicomputer configuration, five of which are active.

The three MVCF-860 super-minicomputer systems, located in the main cabin of the aircraft, are allocated to both the operations and control and radar subsystems as required as JSTARS general purpose computers. The GPCs host the OCO and radar data operations CPCI software. Two of these MVCF-860 super-minicomputers are configured as active processors with one allocated as a spare. Two of the three, one active and one spare, are interfaced to the junction box for system discrete, bidirectional command and control, and peripheral, that is, message page printer, communications. In addition, all three systems are interfaced to the junction box to obtain time synchronization signals. Each of these processors is interfaced to each of the LANs, to each of the MIL-STD-1553B data busses and to each of the three MADS units, that is, twelve data modules, for a total on-line capacity of over 1.5 gigabytes.

The differences of the preferred embodiment of the invention over previous embodiments provide greater growth potential and increased system flexibility, while reducing the overall complexity associated with utilizing the resources. These advantages are achieved by reducing the number of main processors, increasing the processing capacity of the overall system, providing the capability to incorporate processing capacity enhancements without requiring additional LRUs and enhancing the flexibility of the system by providing identical communications channels to each main processor.

The differences in the operator work station subsystem of the described embodiment over known embodiments are the replacement of the 4020 Level-2 disk units with CDC MADS units and upgrading the DDP disk interface from a storage module device type to a synchronous small computer systems interface type. The throughput of the SCSI, when operating synchronously, is a maximum of 4 mbytes/second instead of being limited to a maximum of 0.960 mbytes/second available via a SMD interface. The SCSI also provides the capability of configuring a host computer for access with up to seven additional bus nodes. In addition, the CDC MADS units provide the capability for any DDP to access any of the four data modules contained in a single disk unit, and are capable of supporting four DDP SCSIs simultaneously.

The aforedescribed change in the operator work station subsystem 19 increases the flexibility and performance of the overall system by enhancing the mass storage throughput capabilities of the DDP, by utilizing a SCSI disk interface and by utilizing identical disk configurations for both the Level-1 and Level-2 functionality. These permit the use of a single DDP for multiple, simultaneous data module access.

Figure 3:
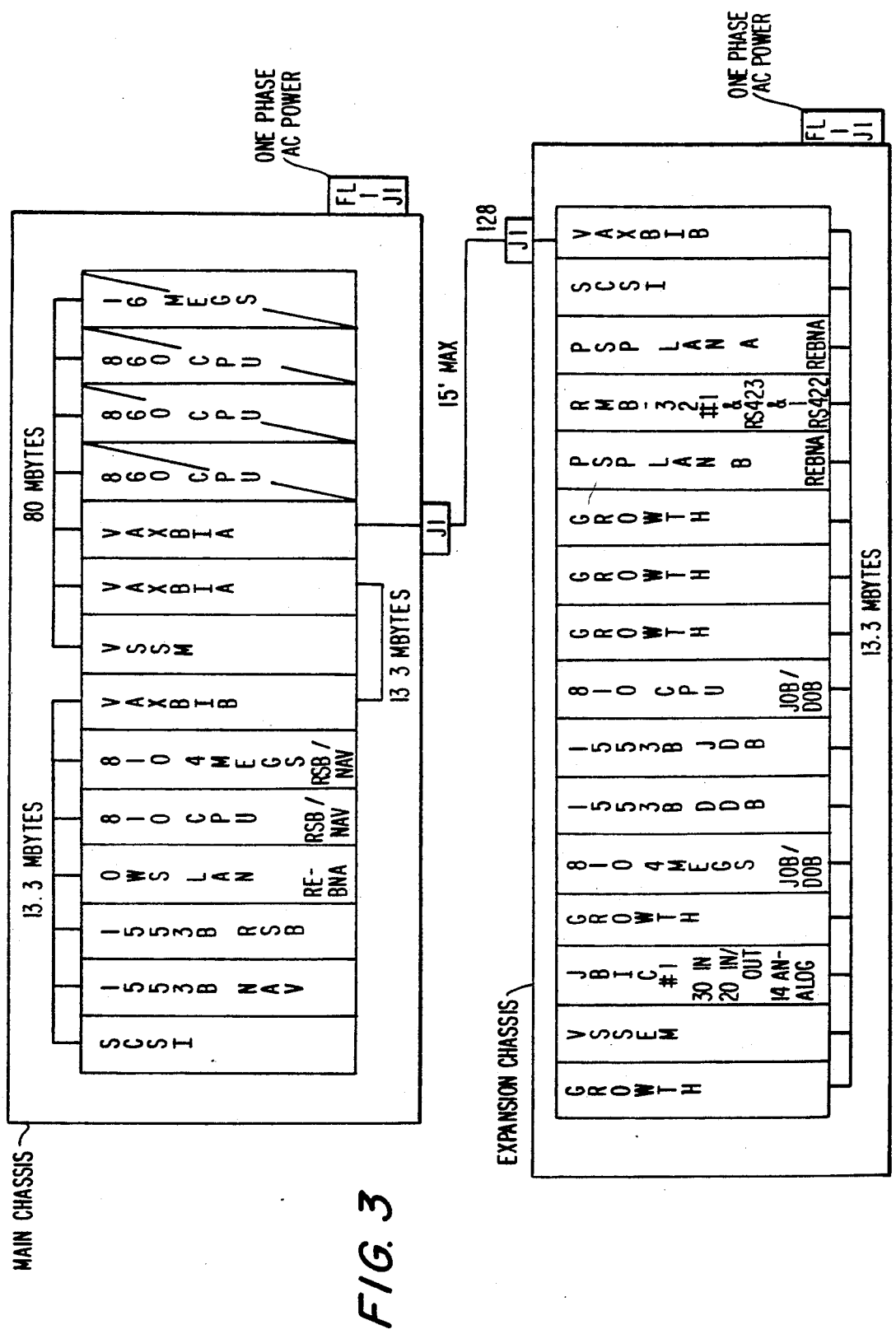
FIG. 3 is a schematic diagram of the main chassis of the MVCF-860.

The MVCF-860 of Raytheon Company used in the embodiment of FIG. 2 of the invention executes the identical instruction set architectures as any Digital Equipment Corporation VAX computer and is designed to operate with either one, two, or three CPUs and/or memory units. The proposed JSTARS configuration, shown in FIG. 3, which is a schematic diagram of the main chassis of the MVCF-860, utilizes three CPUs and 16 mbytes of internal dynamic random access memory, providing an effective processing power of 7.0 mWhetstone per MVCF-860 chassis. This equates to five times the processing power of a single Hawk/32. To support future processing requirements, the processor memory bus, which connects the CPUs and memory, is designed to accept the next generation of Raytheon-developed single card CPU and 64 mbyte memory units without modification to the existing chassis.

The input/output (I/O) for the MVCF-860 is provided via two VAXBI busses 27 and 28. The first VAXBI bus 27 provides the data/control path for up to six I/O adapters resident within the MVCF-860 ATR enclosure. The second VAXBI bus 28 provides the data/control path for external I/O adapters contained in the MVCF-860 I/O expansion chassis. Each VAXBI bus is capable of maximum input transfer rates of 13.3 mbytes per second and an output of 5 mbytes per second, providing over ten times the input rate of the Hawk/32 and five times the output rate. The internal I/O bus supports the Raytheon Model 810 single card version of the main CPUs and associated four mbytes memory card.

The maintenance monitoring function of the MVCF-860 is performed by the VAX system support module, which compiles the built-in test results of the CPUs, memory, and all I/O modules, connected both internally and externally to the computer. After the results have been compiled, they are displayed on the front panel of the computer via an alphanumeric display and remoted over an RS-423 type interface. The information displayed identifies the type of SRU and its physical location within the chassis. There are also both red and green LEDs on each of the SRUs to identify the status of each of the SRUs. The fault detection and isolation capabilities of the Hawk/32 require that either support equipment, such as terminal or computer, be used, or the top cover be removed, with power applied, to examine the LEDs on each SRU to identify the faulty SRU(s).

Reliability for the MVCF-860 is a major improvement over the Hawk/32 primarily due to the use of MIL-STD-883C methods 5004 and 5005 screened parts and the use of lower power, high density mature CMOS VLSI chip design. The MTBF of the MVCF-860 is expected to be three times that of the Hawk/32. As an LRU, the MVCF-860 is subjected to non-operating temperature of −54 degrees C, while operating during the low-to-high temperature transition, 5 degrees C per second, and continues to operate at 71 degrees C for two hours.

The MVCF-860 also provides a much more fault tolerant system than previous systems. The MVCF-860 booting sequence first verifies the status of each CPU and selects the first CPU to successfully complete its BIT routine to be the boot CPU. The selected boot CPU then communicates with each of the other CPUs and the memory, verifying the bus operation. Any CPU which fails BIT is locked out of the system, and the boot CPU begins to boot the system. The failed SRU data is supplied to the VSS module and displayed at the front panel. Any SRUs which fail BIT and are not utilized in the boot function, that is, the VAXBI adapters or SCSI adapter, do not prevent the system from booting. This functionality provides the operator with control over the system to determine if the computer is healthy enough to perform the desired functions. This fault tolerance is not available in the current Hawk/32, which treats all detected SRU BIT failures as fatal, and halts the computer, preventing the booting operation.

The CDC MADS 20 is a 5.25 inch Winchester technology militarized disk system. The backbone of the MADS design is the internal bus structure, the MADS bus 29. The controllers and SCSI host adapters are on the MADS bus 29 and communicate with each other using a protocol similar to the SCSI bus over a 16 bit parallel bus at eight mbytes per second. Each of the controllers is capable of transferring data at a sustained rate of 1.0 mbyte per second over the MADS bus producing a peak burst rate of only fifty percent of the bandwidth; providing 100 percent growth potential and significantly reducing contention on the internal bus.

The JSTARS of the invention includes a total of six MADS units functioning as three Level-1 and three Level-2 disks. Regardless of how they are utilized, all MADS units are identical. Each MADS controller provides the disk formatting function without any external software, and can be performed in both the Level-1 and Level-2 configurations. This provides in-flight formatting capability of the OWS disk not available in earlier embodiments of the invention. Additional advantages of the invention include a data destruct capability, the ability to copy data from one RTMM to another within the Level-2 chassis, and the ability to copy data from any RTMM connected on a single SCSI bus in the Level-1 configuration to another.

Figure 4:
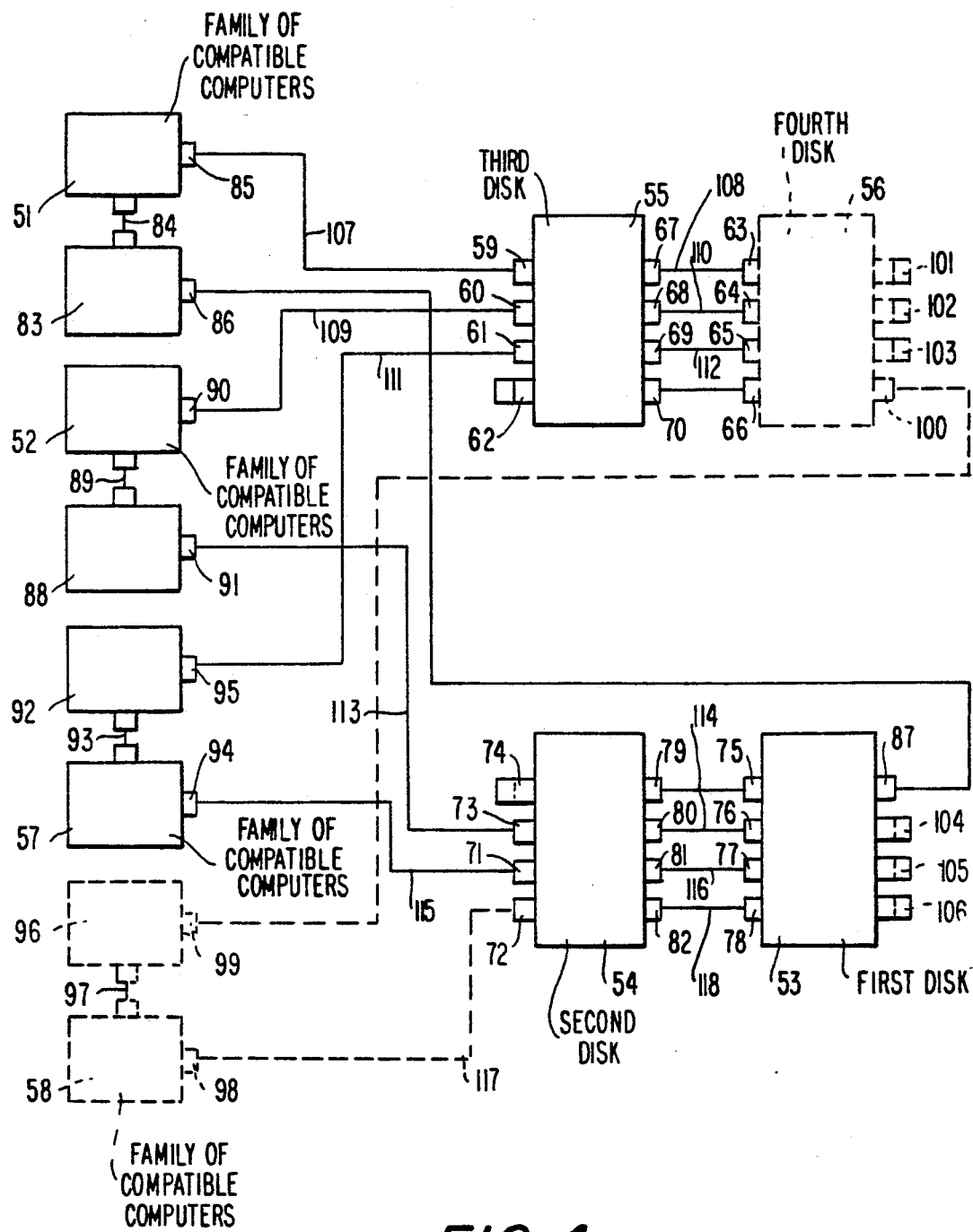
FIG. 4 is a block diagram of the Level-1 utilization of three MADS units.

The Level-1 utilization of three MADS units is shown in FIG. 4, wherein each of the MVCF-860 super-minicomputer systems is interfaced such that any one of the MVCF-860 systems, including the one performing radar data processing, may access any of the twelve data modules. In FIG. 4, each of first and second VAXes 51 and 52 is connected to the third of first, second, third and fourth disks 53, 54, 55 and 56, respectively. Each of third and fourth VAXes 57 and 58 is connected to the second disk 54. The third disk 55 has inputs 59 and 60 connected to the VAXes 51 and 52, respectively, a third input 61 and a terminal 62. The fourth disk 56 has inputs 63, 64, 65 and 66 and the third disk 55 has outputs 67, 68, 69 and 70, respectively, connected to said inputs.

The second disk 54 has inputs 71 and 72 connected to the VAXes 57 and 58, respectively, a third input 73 and a terminal 74. The first disk 53 has inputs 75, 76, 77 and 78 and the second disk 54 has outputs 79, 80, 81 and 82, respectively, connected to said inputs. The first VAX 51 is connected to a first Raytheon MVCF-860 computer expansion chassis or EXP 83 via an Input/Output bus 84. The first VAX 51 has a small computer systems interface 85 connected to the input 59 of the third disk 55. The first EXP 83 has a small computer systems interface 86 connected to an output 87 of the first disk 53.

The second VAX 52 is connected to a second Raytheon MVCF-860 computer expansion chassis or EXP 88 via an Input/Output bus 89. The second VAX 52 has a small computer systems interface 90 connected to the input 60 of the third disk 55. The second EXP 88 has a small computer systems interface 91 connected to the input 73 of the second disk 54.

The third VAX 57 is connected to a third EXP 92 via an Input/Output bus 93. The third VAX 57 has a small computer systems interface 94 connected to the input 71 of the second disk 54. The third EXP 92 has a small computer systems interface 95 connected to the input 61 of the third disk 55. The fourth VAX 58 is connected to a fourth EXP 96 via an Input/Output bus 97. The fourth VAX 58 has a small computer systems interface 98 connected to the input 72 of the second disk 54. The fourth EXP 96 has a small computer systems interface 99 connected to an output 100 of the fourth disk 56.

The fourth disk 56 has terminals 101, 102 and 103 and the first disk 53 has terminals 104, 105 and 106. The inputs and outputs 59 and 67, 60 and 68 and 61 and 69 and the terminal 62 and output 70 of the third disk 55 are those of first, second, third and fourth small computer systems interfaces, respectively. The inputs and terminals 63 and 101, 64 and 102, 65 and 103 and the input and output 66 and 100 of the fourth disk 56 are those of first, second, third and fourth small computer systems interfaces, respectively. The terminal 74 and output 79 and inputs and outputs 73 and 80, 71 and 81 and 72 and 82 of the second disk 54 are those of first, second, third and fourth small computer systems interfaces, respectively. The input and output 75 and 87 and inputs and terminals 76 and 104, 77 and 105 and 78 and 106 of the first disk 53 are those of first, second, third and fourth small computer systems interfaces, respectively.

The total length of cables 107 and 108 must be less than 30 feet. The total length of cables 109 and 110 must be less than 30 feet. The total length of cables 111 and 112 must be less than 30 feet. The total length of cables 113 and 114 must be less than 30 feet. The total length of cables 115 and 116 must be less than 30 feet. The total length of cables 117 and 118 must be less than 30 feet.

The circuit of FIG. 4 provides greater mass storage access to each of the main processors and simplifies the complexities associated with reconfiguration over that of the known systems.

The Level-2 configuration of three MADS units is shown in FIG. 5, wherein focus of the digital display processors are interfaced to one MADS unit allocated for Level-2 use. In FIG. 5, a first Level-2 disk 119 has terminals 120, 121, 122 and 123 for first, second, third and fourth small computer systems interfaces, respectively. A second Level-2 disk 124 has terminals 125, 126, 127 and 128 for first, second, third and fourth small computer systems interfaces, respectively. A third Level-2 disk 129 has terminals 130, 131, 132 and 133 for first, second, third and fourth small computer systems interfaces, respectively. A fourth Level-2 disk 134 has terminals 135, 136, 137 and 138 for first, second, third and fourth small computer systems interfaces, respectively.

First to fifteenth operator work stations 139, 140, 141, 142, 143, 144, 145, 146, 147, 148, 149, 150, 151, 152 and 153 are provided, as shown in FIG. 5. The first to fifteenth operator work stations 139 to 153 have digital display processors 154, 155, 156, 157, 158, 159, 160, 161, 162, 163, 164, 165, 166 and 167, respectively. The digital display processors 168, 167, 163 and 162 of the fifteenth, fourteenth, tenth and ninth operator work stations 162, 163, 167 and 168, respectively, are connected to first, second, third and fourth small computer systems interfaces, respectively, of the first disk 119.

The digital display processors 142, 165 and 166 of the fourth, twelfth and thirteenth operator work stations 142, 150 and 151, respectively, are connected to second, third and fourth small computer systems interfaces, respectively, of the fourth disk 134. The digital display processors 164, 156, 155 and 154 of the eleventh, third, second and first operator work stations 149, 141, 140 and 139, respectively, are connected to first, second, third and fourth small computer systems interfaces, respectively, of the third disk 129. The digital display processors 161, 160, 159 and 158 of the eighth, seventh, sixth and fifth operator work stations 146, 145, 144 and 143, respectively, are connected to first, second, third and fourth small computer systems interfaces, respectively, of the second disk 124.

The first to fifteenth operator work stations 139 to 153 have operator station control switches 169, 170, 171, 172, 173, 174, 175, 176, 177, 178, 179, 180, 181, 182 and 183, respectively. The operator station control switches 169 to 183 are shown in their ON positions. When the arms of the switches 169 to 183 are raised, said switches are in their OFF positions. A power supply of 30V AC is supplied to the first, second, third and fourth disks 119, 124, 129 and 134 via power terminals 184, 185, 186 and 187, respectively, and 24V DC is supplied to the operator work stations 139 to 153 via inductance units 189, 190, 191 and 192, respectively.

The PSP LAN 18 is a high speed, asynchronous, bidirectional communications channel to provide a communications interface between the PSPs and the MVCF-860 super-minicomputer systems. The PSP LAN 18 is electrically identical to the OWS LAN 16, and utilizes identical transceivers. The PSP LAN 18 contains two separate channels A and B, with each PSP being capable of selecting, as its primary communications interface, either of the two channels. These channels are utilized simultaneously for communications between the PSPs and the MVCF-860 systems, with two of the PSPs utilizing one channel and the remaining PSPs utilizing the other channel.

The SMD interface of the DDP 21 is a differential, synchronous SCSI bus module. This provides a high degree of flexibility in the selection of future mass storage devices, that is, optical disk, magnetic tape, etc., and on-line storage growth to 3.5 gigabytes using a MADS unit.

The JTIDS bus 14 is a MIL-STD-1553B asynchronous, bidirectional communications channel which interfaces the JTIDS terminals to all MVCF-860 superminicomputers. Only one JTIDS terminal is maintained on line, in the preferred embodiment of the invention. However, both terminals are removed from the existing DDB and installed on the dedicated JDB in the preferred embodiment of the invention. The JDB is electrically identical to the existing DDB, and provides identical interface capabilities.

In the preferred embodiment of the invention, the VAX/VMS operating system may be used for both modes of operation on the aircraft and for software development. This simplifies the transitions between support and operational modes on the aircraft and reduces the complexity of software development and maintenance.

VAX/VMS is a layered operating system which provides multi-level services for I/O operations, memory management and process scheduling and control. A command language interface is used to interact with the system at the highest level. At the application programming level, VAX/VMS services, accessed using system service calls and run time library procedures, are used to interact with the system. VAX/VMS supports a large diversity of application development tools, including language compilers, a linker, language-sensitive editors, symbolic debugging tools, extensive online help features, application/system tuning tools, forms utilities and software management utilities. Other facilities supported by the operating system include multi-level record and file management utilities, sort utilities, error handling, text editors, system message facilities and extensive services for interprocess communications, synchronization and data/code sharing. VAX/VMS provides the multi-level services for I/O operations, memory management and process scheduling and control necessary to perform system development, support and operations functions. The most significant feature of VAX/VMS is its adaptability for support of a wide variety of environments.

VAX/VMS is a general-purpose operating system with the designed-in flexibility to support either interactive processing, such as that found in the JSTARS support mode environment, or real-time processing that requires rapid response to specific events, such as that required for JSTARS operational processing. When used as a real-time operating system, specific tailoring capabilities can be used to provide an environment that best meets the specific needs of the application. These tailoring capabilities include specific application design practices as well as the adjustment of system parameters which effect how the operating system responds under different conditions.

Important application design practices that help to increase the real-time responsiveness of the system are:

(1) Setting the priority of response critical processes to the "real-time" priority range. VAX/VMS provides the capability to prioritize each process individually for either time-share or time-slice execution. There are thirty-two levels of priority, with the lower sixteen serviced as time-share and the upper sixteen scheduled as time-slice processes. The processes are scheduled within each category based on their assigned priority level. The time-share priority levels are used to support the execution of highly interactive processes such as those utilized within a development environment. The time-slice levels are used to support the execution of event-driven processes, such as those utilized within a real-time environment.

(2) Locking the entire application, or its critical pages, into memory to avoid page fault processing.

(3) Ordering the priority of processes which must respond to external events. Since a process is pre-empted immediately when another process of greater or equal priority becomes computable, the time critical process should be at a higher priority.

(4) Utilizing the symmetric multiprocessing features of VAX/VMS to improve real-time throughput and permit optimal response to external events.

A partial list of VAX/VMS system parameters that can be adjusted to help increase the real-time responsiveness of the system is:

(1) NPAGEDYN—Non-paged dynamic—Determines the number of bytes to allocate for the non-paged dynamic pool. This includes parts of VAX/VMS (device drivers, etc.) which cannot be paged.

(2) MVTIMEOUT—Mount verification time-out—This is the time in seconds VAX/VMS will wait for a disk which has gone off-line to become available before it is declared inoperative. The reduction of this value permits quicker recognition of disk failures.

(3) MAXBUF—Maximum size of buffered I/O transfer—Maximum number of bytes that can be transferred in one buffered I/O request.

(4) QUANTUM—Processor time—Maximum amount of processor time a process can receive while other processes are waiting. The default quantum time period of 200 milliseconds is normally sufficient for most applications. This value also determines when system rescheduling will occur.

(5) REALTIMESPTS—Number of SPTEs to pre-allocate for use by real-time processes connecting to devices via the connect to interrupt driver. It sets the number of SPTEs for mapping connect-to-interrupt processes into system space.

(6) SYSMWCNT—System working set count—Establishes the number of pages for the working set containing the currently resident pages of pageable system space. This parameter must be closely monitored, because if it is too small the operating system will start page faulting. The real-time performance goal is for the system working set to be large enough for all pageable portions of VAX/VMS to be memory resident.

(7) TIMEPROMPTWAIT—Time prompt time-out—Sets the amount of time to wait for the time of day when booting. A TIMEPROMPTWAIT value of zero means that VAX/VMS is to reset the time without human intervention.

(8) WSMAX—Maximum size of process working set—Determines the system wide maximum size of a process working set regardless of process quota.

The application software may require large working sets to lock the real-time programs in memory.

Interrupt latency is the time it takes from the occurrence of an interrupt to the start of execution of the interrupt service routine which handles that interupt. VAX/VMS is designed to minimize interrupt latency and therefore keep external devices as busy as possible. This is achieved by the implementation of what is referred to as "fork processing." Fork processing is a mechanism by which VAX/VMS services the device interrupt at an elevated priority and then saves, in a fork block, part of the context of the interrupt for processing at a lower priority. This minimizes the time other device interrupts of the same priority are blocked from service and permits maximum I/O throughput for all devices on the bus. This type of implementation in VAX/VMS requires the device driver to spend as little time as possible in the interrupt service routine before forking to a lower priority. If the device driver code permits preemption by a re-entrant ISR and fork processing code, the ISR from a new interrupt and the fork code from a previous interrupt could execute concurrently in the symmetrical multi-processing environment.

For JSTARS, on-line processing files are to be pre-allocated, opened during system initialization and not deleted or closed until the end of the mission. The file services do not pose a real-time performance concern. The VAX/VMS operating system, performing in the militarized version of the VAX 6230 (the Raytheon MVCF-860), provides the rapid response and performance needed to implement the real-time processing requirements of JSTARS.

In the preferred embodiment of the invention, mission-mode spare processor operations are allocated to a single MVCF-860, designated the spare. The CDP and RDP backup functionality is accomplished using 3.71 mbytes of the 16 mbytes available in this processor. This translates into an overall spare processor memory utilization percentage of 331. These utilization estimates are very conservative due to the use of the 25 bytes per 1 HOL line of code translation factor. The estimate is also conservative in that the entire system manager functionality is assumed to be active on the spare processor during mission-mode operations. In actuality, a greatly reduced subset of system manager functionality is required, which would actually reduce the estimate by approximately 715 kbytes.

In the CDP, a CDC MADS disk subsystem is connected to each of the three MVCF-860s. Each MADS unit is a 4-drive configuration having a capacity of 135.7 mbytes. This minimal reduction (3.1%) in disk capacity is not anticipated to cause any disk capacity problems.

In disk sizing, all calculations use kbyte as 1,024 bytes, and mbyte as 1,024 kbytes. A mbyte therefore equals 1,048,576 bytes. Each MADS disk has approximately 142,295,000 bytes (formatted), or 135.7 mybtes.

Table I is a high-level summary of the processor and bus utilization data hereinbefore provided. For processor throughput, reserve capacity is 163% for the MVCF-860 functioning as CDP and 92% for the MVCF-860 functioning as RDP. For internal busses, reserve capacity is 3900% for OWS LAN, 157% for PSP LAN, 376% for DDB bus and 244% for the new JDB bus. For processor memory, reserve capacity is 150% for the MVCF-860 functioning as CDP and 163% for the MVCF-860 functioning as RDP.

Substantial reserves exist for all categories of I/O channels; discrete inputs, discrete outputs, analog inputs and serial channels and disk space is more than adequate on both Level 1 and Level 2 disk units. Additionally, one LAN could satisfy the JSTARS requirement (334 kbytes/second + 66 kybtes/second installed reserve + 66 kbytes/second uninstalled reserve = 466 kbytes/second). It is thus clear that the preferred embodiment of the invention provides adequate capacity and substantial reserve capacity.

TABLE I

| PROCESSOR/BUS | UTILIZATION % | RESERVE % |
| --- | --- | --- |
| CDP throughput | 42.9 | 133 |
| RDP throughput | 52 | 92 |
| OWS LAN throughput | 2.8 | 3,471 |
| PSP LAN throughput | 13.9 | 619 |
| DDB BUS throughput | 16.8 | 495 |
| JDB BUS throughput | 8.6 | 1,062 |
| CDP memory | 40 | 150 |
| RDP memory | 38 | 163 |

The preferred embodiment of the invention is more compact, more flexible, more reliable, more easily maintained, less complex and more powerful than known embodiments of the invention. The major features of the preferred embodiment of the JSTARS of the invention are the utilization of system level data busses, centralized data processing facilities and the growth capability of these facilities. The preferred embodiment provides the major benefits of future growth plan, reduced life cycle cost, improved reliability, enhanced maintainability and improved logistics and supportability.

Multiple MVCF embedded single board module computer (ESMC) Model 810 and associated 4 mbytes of memory are incorporated into each MVCF-860 system, additional 1553B data busses are incorporated, the junction box is upgraded and a fourth MVCF-860 is incorporated into the system. The key to providing enhancements to the MVCF-860 systems is the growth card slots contained in both the main and expansion chassis of the MVCF-860 super-minicomputer system. The MVCF-860 super-minicomputer has a main chassis containing three growth card slots and an expansion chassis which contains three JBIC modules and five growth card slots. In the upgraded junction box, two of the JBIC modules are removed, resulting in a total of seven growth card slots in the expansion chassis.

The primary enhancement of the MVCF-860 systems of the JSTARS of the invention is the MVCF embedded single board module computer model 810 (ESMC-810) and associated 4 mbytes of memory. The ESMC-810 is a state-of-the-art 32-bit CPU which provides approximately 2 mwhets of throughput. The ESMC-810 is utilized as front-end I/O processors for the 1553B data busses. Incorporating the ESMC-810 processors and associated 4 mbytes of memory enables data bus unique functions to be relocated from the main CPUs of the MVCF-860 systems. This relocation not only increases the available growth capacity of the main CPUs and memory, but also increases the responsiveness of the overall system by reducing the I/O processing overhead of the main CPUs. A number of data bus unique functions would benefit from this capability. These are 1553B data bus control processing, motion compensation, relative navigation, SCDL/JTIDS relay processing and self-defense suite processing.

Although shown and described in what are believed to be the most practical and preferred embodiments, it is apparent that departures from the specific systems described and shown will suggest themselves to those skilled in the art and may be made without departing from the spirit and scope of the invention. We, therefore, do not wish to restrict ourselves to the particular construction described and illustrated, but desire to avail ourselves of all modifications that may fall within the scope of the appended claims.

We claim:

1. In a radar system, central data processor means comprising a plurality of computer family super-minicomputers, each having an input/output expansion chassis and a disk system unit;
programmable signal processor means;
a high speed, asynchronous, bidirectional communications channel providing a communications interface between said programmable signal processor means and said super-minicomputers;
joint tactical information distribution system means;
a joint tactical information distribution system asynchronous, bidirectional communications channel interfacing said joint tactical information distribution system means to said super-minicomputers;
digital display processor means comprising a plurality of advanced disk system units and small computer systems interface means interposed between one of said advanced disk system units and the rest of said digital display processor means;
operator work station local area network means interfacing said digital display processor means and said input/output expansion chassis of said central data processor means.

2. In a radar system as claimed in claim 1, wherein each of said militarized computer family super-minicomputers comprises a Raytheon Company VAX computer family model 860 super-minicomputer.

3. In a radar system as claimed in claim 2, wherein each of said input/output expansion chassis comprises a Raytheon Company MVCF-860 I/O expansion chassis.

4. In a radar system as claimed in claim 3, wherein each said advanced disk system unit comprises a Control Data Corporation advanced disk system unit.

5. In a radar system as claimed in claim 1, wherein said computer family super-minicomputers number three.

* * * * *